United States Patent
Klimovski et al.

(10) Patent No.: US 11,772,337 B2
(45) Date of Patent: Oct. 3, 2023

(54) PULTRUSION SYSTEMS THAT APPLY LENGTHWISE CURVATURE TO COMPOSITE PARTS

(71) Applicant: The Boeing Company, Chicago, IL (US)

(72) Inventors: Andrew Klimovski, Melbourne (AU); Karlgren Ka-Tsun Lai, Doncaster East (AU); Benjamin Stanislaw Zielinski, Melbourne (AU)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 17/348,535

(22) Filed: Jun. 15, 2021

(65) Prior Publication Data

US 2021/0308965 A1    Oct. 7, 2021

Related U.S. Application Data

(62) Division of application No. 15/498,434, filed on Apr. 26, 2017, now Pat. No. 11,065,830.

(51) Int. Cl.
*B29C 70/52* (2006.01)
*B29C 70/20* (2006.01)
(Continued)

(52) U.S. Cl.
CPC ............ *B29C 70/526* (2013.01); *B29C 70/20* (2013.01); *B29C 70/52* (2013.01); *B29C 70/527* (2013.01);
(Continued)

(58) Field of Classification Search
CPC ..... B29C 70/20; B29C 70/526; B29C 70/527; B29C 70/528
See application file for complete search history.

(56) References Cited

U.S. PATENT DOCUMENTS 2,135,763 A * 11/1938 Nicholson ............... B30B 5/062
    100/211
3,151,354 A * 10/1964 Boggs ................... B29C 70/527
    226/173
(Continued)

FOREIGN PATENT DOCUMENTS

DE    102009053967 A1    5/2011
EP        2586600 A1    5/2013
(Continued)

OTHER PUBLICATIONS

Chinese office action; Application 2018103297450; dated Aug. 23, 2021.
(Continued)

*Primary Examiner* — Matthew J Daniels
(74) *Attorney, Agent, or Firm* — Duft & Bornsen, PC

(57) ABSTRACT

Systems and methods are provided for applying lengthwise curvature to composite parts. One embodiment is a method that includes fabricating a preform for a curved pultruded gap filler by continuously: heating fiber reinforced material to a sticking point temperature for a constituent material within the fiber reinforced material, and feeding the fiber reinforced material through a die that exhibits a curvature through which the fiber reinforced material travels while the fiber reinforced material is heated to the sticking point temperature, the die forming the fiber reinforced material into a preform for a gap filler. Fabricating the curved pultruded preform further includes varying path lengths of fibers within the preform as the preform passes through the die, and pulling the preform out of the die.

20 Claims, 11 Drawing Sheets

(51) Int. Cl.
    *B29K 105/08* (2006.01)
    *B29K 307/04* (2006.01)
    *B29L 31/30* (2006.01)
    *B29K 101/12* (2006.01)

(52) U.S. Cl.
    CPC ........ *B29C 70/528* (2013.01); *B29K 2101/12* (2013.01); *B29K 2105/08* (2013.01); *B29K 2307/04* (2013.01); *B29L 2031/3076* (2013.01)

(56) References Cited

U.S. PATENT DOCUMENTS

| | | | | |
|---|---|---|---|---|
| 3,169,272 | A * | 2/1965 | Maxson | B29C 48/903 |
| | | | | 264/209.4 |
| 3,759,651 | A * | 9/1973 | Beyer | B29C 48/9115 |
| | | | | 425/325 |
| 3,804,567 | A * | 4/1974 | Recknagel | B29C 48/903 |
| | | | | 425/445 |
| 3,804,574 | A * | 4/1974 | Gatto | B29C 44/50 |
| | | | | 425/325 |
| 3,873,399 | A * | 3/1975 | Goldsworthy | B29C 70/527 |
| | | | | 264/281 |
| 4,022,557 | A * | 5/1977 | Johnson | B29C 48/919 |
| | | | | 425/71 |
| 4,120,926 | A * | 10/1978 | Titz | B29C 48/11 |
| | | | | 264/237 |
| 5,505,058 | A * | 4/1996 | Dorninger | B29C 48/09 |
| | | | | 425/384 |
| 2005/0108983 | A1* | 5/2005 | Simko | B29C 48/903 |
| | | | | 52/741.1 |
| 2013/0105072 | A1 | 5/2013 | Anderson et al. | |
| 2014/0069586 | A1 | 3/2014 | Anderson et al. | |
| 2015/0129118 | A1 | 5/2015 | Hickman et al. | |

FOREIGN PATENT DOCUMENTS

| | | |
|---|---|---|
| FR | 2504449 A1 | 10/1982 |
| JP | 2012213982 A | 11/2012 |
| JP | 201395139 A | 5/2013 |

OTHER PUBLICATIONS

Korean Office action; Application 10-2018-0037957; dated Nov. 6, 2021.

Japanese Office action; Application 2018-076206; dated Mar. 29, 2022.

Korean office action; Application 10-2022-0092640; dated Mar. 29, 2023.

* cited by examiner

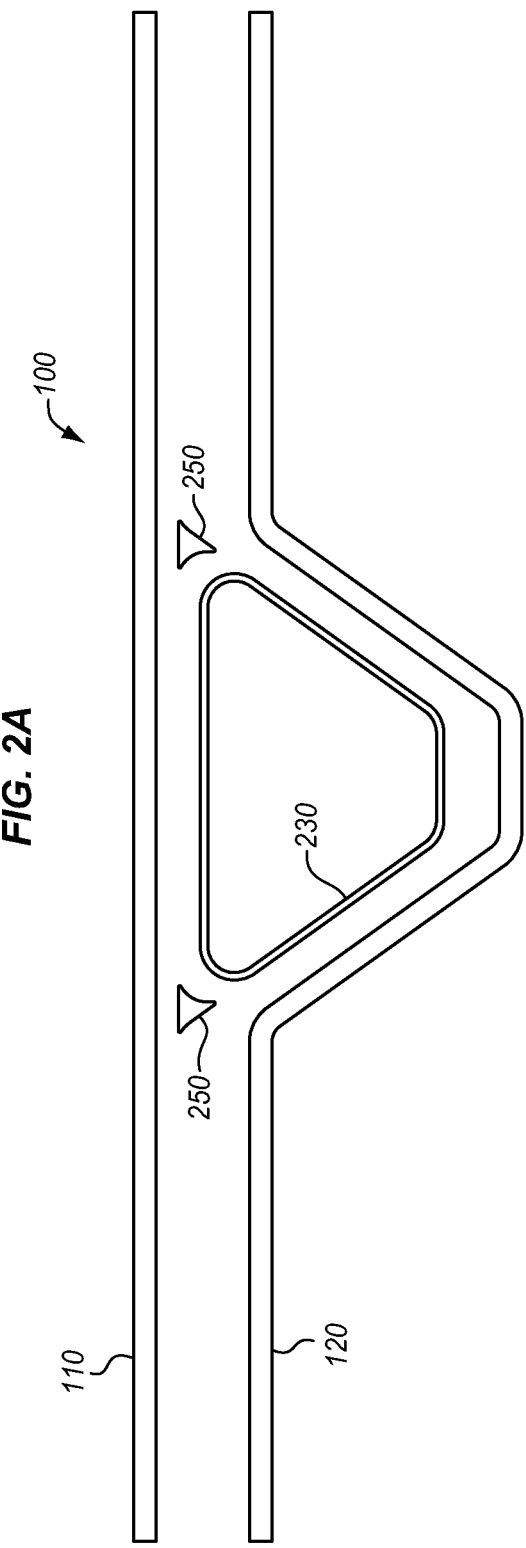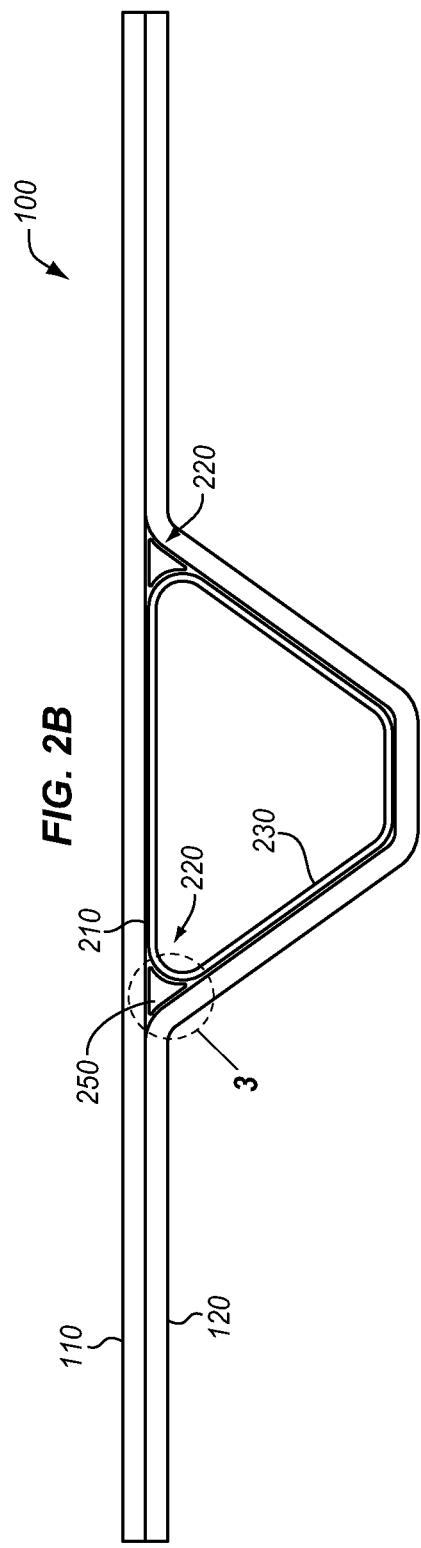

PULTRUSION SYSTEMS THAT APPLY LENGTHWISE CURVATURE TO COMPOSITE PARTS

RELATED APPLICATIONS

This patent application is a division of U.S. patent application Ser. No. 15/498,434, filed on Apr. 26, 2017.

FIELD

The disclosure relates to the field of composite materials, and in particular, to preforms that enhance the strength of joints in composite materials.

BACKGROUND

Multi-layer laminates of constituent material (e.g., Carbon Fiber Reinforced Polymer (CFRP)) may be formed into any of a variety of shapes before they are cured into an integral composite part. For example, dies and/or other forming tools may be utilized to alter the shape of a sheet of laminate. Some types of laminate have been impregnated with a curable resin, and are referred to as "prepreg" laminate. Other types of laminate include "dry fiber" which has not been impregnated with resin, and thermoplastic carbon fiber that includes a thermoplastic resin instead of a thermoset resin.

Popular composite parts include the stringers of an aircraft. However, such composite parts may exhibit sharp bends/corners having tight radii due to the bending of flat layers in order to form a three dimensional structure for the stringer. For example, a "hat" stringer used for an aircraft may have joints between laminates, and these joints may exhibit tight inner corner radii. A tight inner corner radius on a joint may cause that joint to exhibit less-than desired bond strength when the laminates are co-cured. A gap filler (colloquially referred to as a "noodle") is therefore desirable to occupy gaps left over when flat laminates are folded and matched to other folded or flat laminates. Gap fillers may be fabricated and inserted at the joints to fill gaps left by folds for those joints. Gap fillers remain desirable for stringers that exhibit a variety of complex shapes. This may be particularly the case for laminates that have been laid-up flat and then bent into numerous shapes to form structures with cross section in the shape of C's, I's, J's, Z's, etc. For example, a structure forming an "I" shape made from two back-to-back "C" channels and flat laminates capping off the "C" channels may include multiple locations for which gap fillers are desired.

Thus, those who design composite parts continue to desire enhanced systems that are capable of generating gap fillers in a cost-effective manner, capable of fabricating gap fillers having desired strength, and are also capable of reducing the incidence and severity of gap fillers that are out-of-tolerance.

SUMMARY

Embodiments described herein provide for enhanced techniques and systems that are capable of automatically pultruding curved gap fillers that exhibit a radius of curvature along their length that corresponds with a curved stringer. Specifically, embodiments described herein may utilize curved pultrusion dies with integrated cooling systems to permanently enforce a desired geometry onto a material. This automated process increases the precision and speed at which a curved gap filler may be produced.

One embodiment is a method that includes fabricating a preform for a curved pultruded gap filler by continuously: heating fiber reinforced material to a sticking point temperature for a constituent material within the fiber reinforced material, and feeding the fiber reinforced material through a die that exhibits a curvature through which the fiber reinforced material travels while the fiber reinforced material is heated to the sticking point temperature, the die forming the fiber reinforced material into a preform for a gap filler. Fabricating the curved pultruded preform further includes varying path lengths of fibers within the preform as the preform passes through the die, and pulling the preform out of the die.

A further embodiment is an apparatus that includes a pultrusion die. The pultrusion die includes a curved channel that extends internally within the die from an entrance of the die to an exit of the die, a cooling chamber internal to the die that is located downstream of the entrance, and multiple passages that are located relative to the cooling chamber that facilitate heat transfer for the chamber at locations between the entrance and the exit.

A still further embodiment is an apparatus that includes a noodle supplier that provides fiber reinforced material for forming into a preform for a noodle, a heater that increases a temperature of fiber reinforced material received from the noodle supplier, a die imparting a curvature to material that has been heated, forming the preform, and a noodle tensioning device that tensions the preform, thereby pulling the preform through the die.

Yet another embodiment is a system that includes at least one spool for holding a roll of fiber reinforced material comprising a constituent material, and a heater downstream of the spool that heats the fiber reinforced material to a sticking point temperature of the constituent material. The system also includes a pultrusion die, downstream of the heater, that exhibits a channel having a lengthwise curvature that is enforced upon a length of the fiber reinforced material, and forms the fiber reinforced material into a preform for a gap filler, a cooling chamber that cools the preform, and rollers that are located downstream of the pultrusion die and form a nip in a cross-sectional shape of the pultrusion die.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 2A-2B illustrate further views of a hat stringer in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
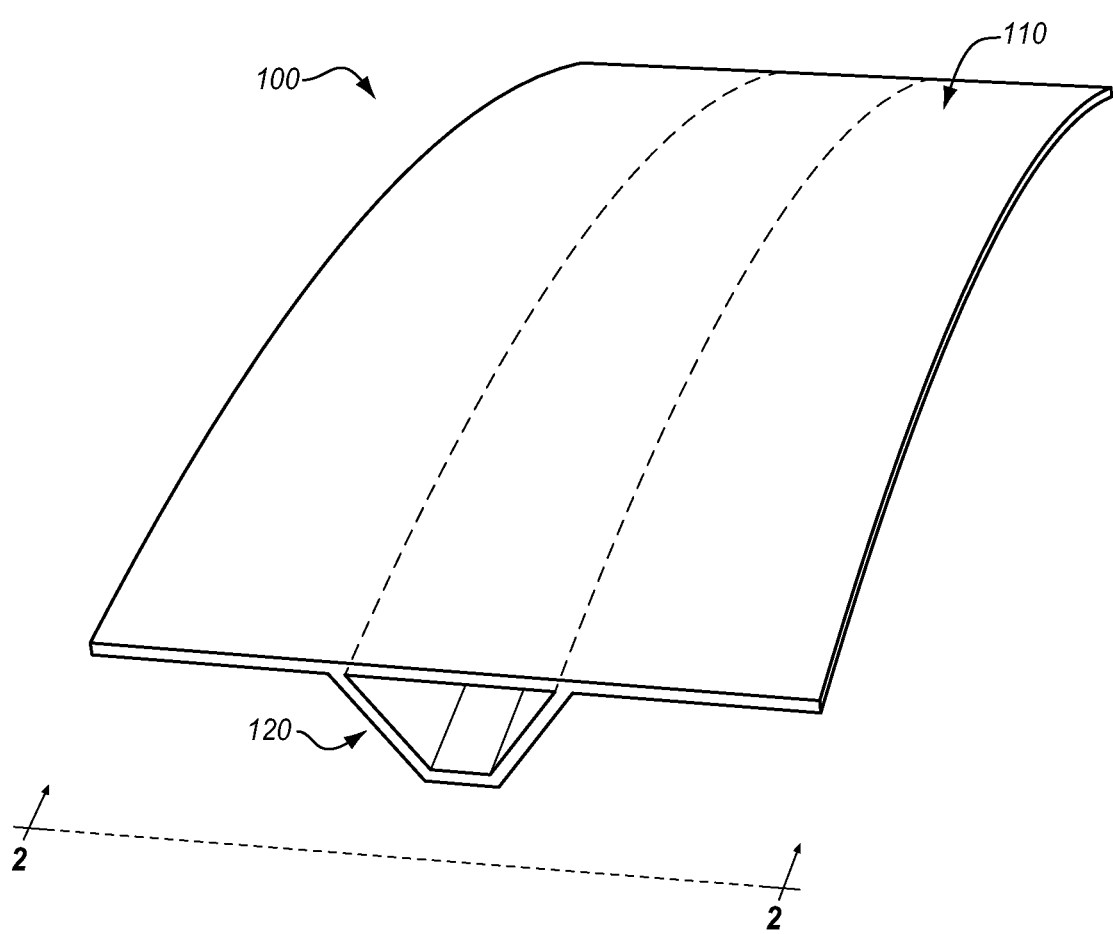
FIG. 1 illustrates a hat stringer in an exemplary embodiment.

FIG. 1 is a perspective view of a curved composite part 100 in an exemplary embodiment. In this embodiment, composite part 100 comprises a "hat" stringer for an aircraft having a multi-layer laminate base 110, and a multi-layer laminate "hat" 120. In this embodiment, each laminate comprises multiple layers of constituent material, such as carbon fiber in "dry fiber" form (i.e., lacking impregnated resin) that may be stabilized by a binding agent (e.g., a tackifier). After being laid-up and conformed to a desired shape (e.g., via consolidation of a pre-form), base 110 and hat 120 are co-cured (e.g., via the application of heat in a vacuum) in order to form an integral composite part (e.g., a cured carbon fiber stringer exhibiting desired strength).

Delving deeper into the geometry of composite part 100, FIGS. 2A-2B provide end views of composite part 100 corresponding with view arrows 2 of FIG. 1. FIG. 2A is an exploded end view, while FIG. 2B is a standard end view. As shown in FIG. 2B, hat 120 and base 110 unite at joint 220. Without a preform 250 for a gap filler, joint 220 would exhibit a tight radius of curvature. Hence, preform 250 is desired to form joint 220 without voids. Hence, part 100 includes preform 250 placed within volume 210 at joint 220. Preform 250 may also be referred to as a preform for a "noodle" or "spacer." Preform 250 fills voids out at joint 220, thereby increasing the strength of joint 220 and preventing dis-bond between base 110 and hat 120. A laminate wrap 230 is also illustrated to further secure preform 250 within composite part 100. The various components shown for composite part 100 may be co-cured together in order to unify them into a single, integral composite part 100.

Figure 3:
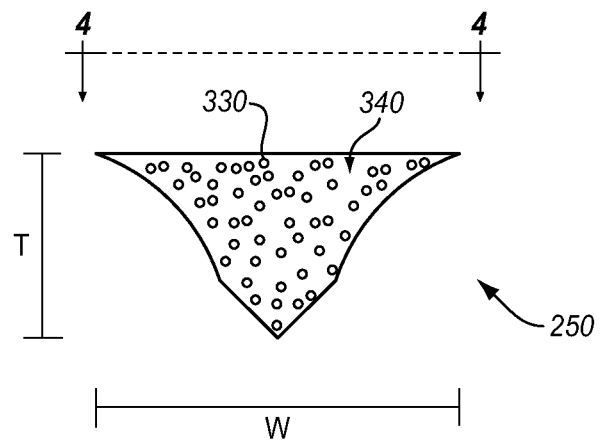
FIGS. 3-4 illustrate a preform for a curved gap filler in an exemplary embodiment.

FIG. 3 is a zoomed in front view of a preform 250 for a gap filler. Specifically, FIG. 3 corresponds with view arrows 3 of FIG. 2B. As shown in FIG. 3, preform 250 exhibits a width W and a thickness T. These properties may vary along the length of preform 250, and the width may even vary within preform 250. In this embodiment, preform 250 includes fibers 330 (e.g., carbon fibers) integrated with (or within) a binder 340. Binder 340 may comprise a thermoplastic veil, thermoset resin, or even a combination thereof. Meanwhile, the carbon fibers may be continuous and straight, or may even be woven, braided, or comprise chopped fiber in random orientations. Note that in some embodiments, preform 250 may be made from one or more layers/plies of material. Individual layers/plies are not illustrated in FIG. 4 for reference purposes, as a single ply embodiment is shown.

Figure 4:
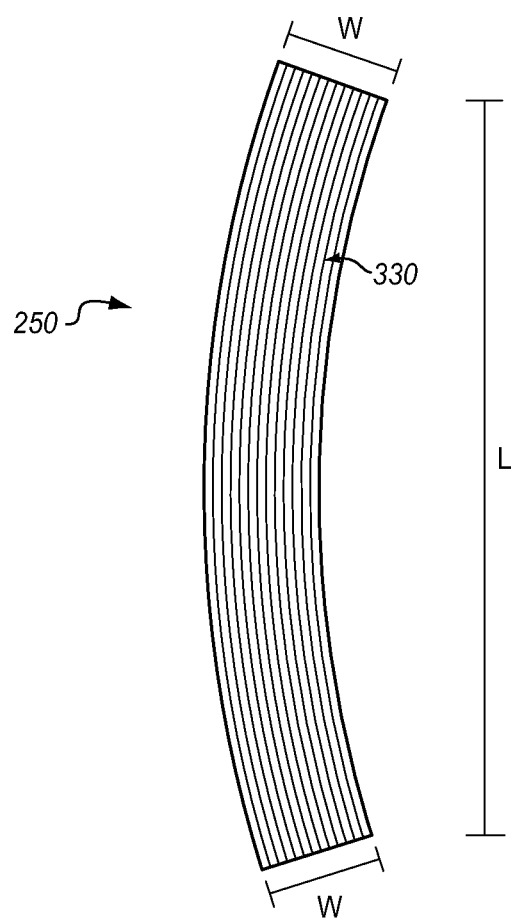

FIG. 4 is a top view of preform 250 of FIG. 3. FIG. 4 illustrates that preform 250 is curved along its length (L). FIG. 4 further illustrates that fibers 330 within preform 250 are oriented such that they extend along the length of preform 250 as preform 250 curves. While preform 250 is shown as being roughly ten times as long as its width in FIG. 4, it should be understood that preform 250 may be particularly long (e.g., on the order of tens of meters) and particularly narrow (e.g., varying in width but averaging a few centimeters), and may result from a continuous manufacturing process. In embodiments wherein long continuous fibers are utilized to form preform 250, preforms 250 may be spliced together in order to increase length.

Figure 5A:
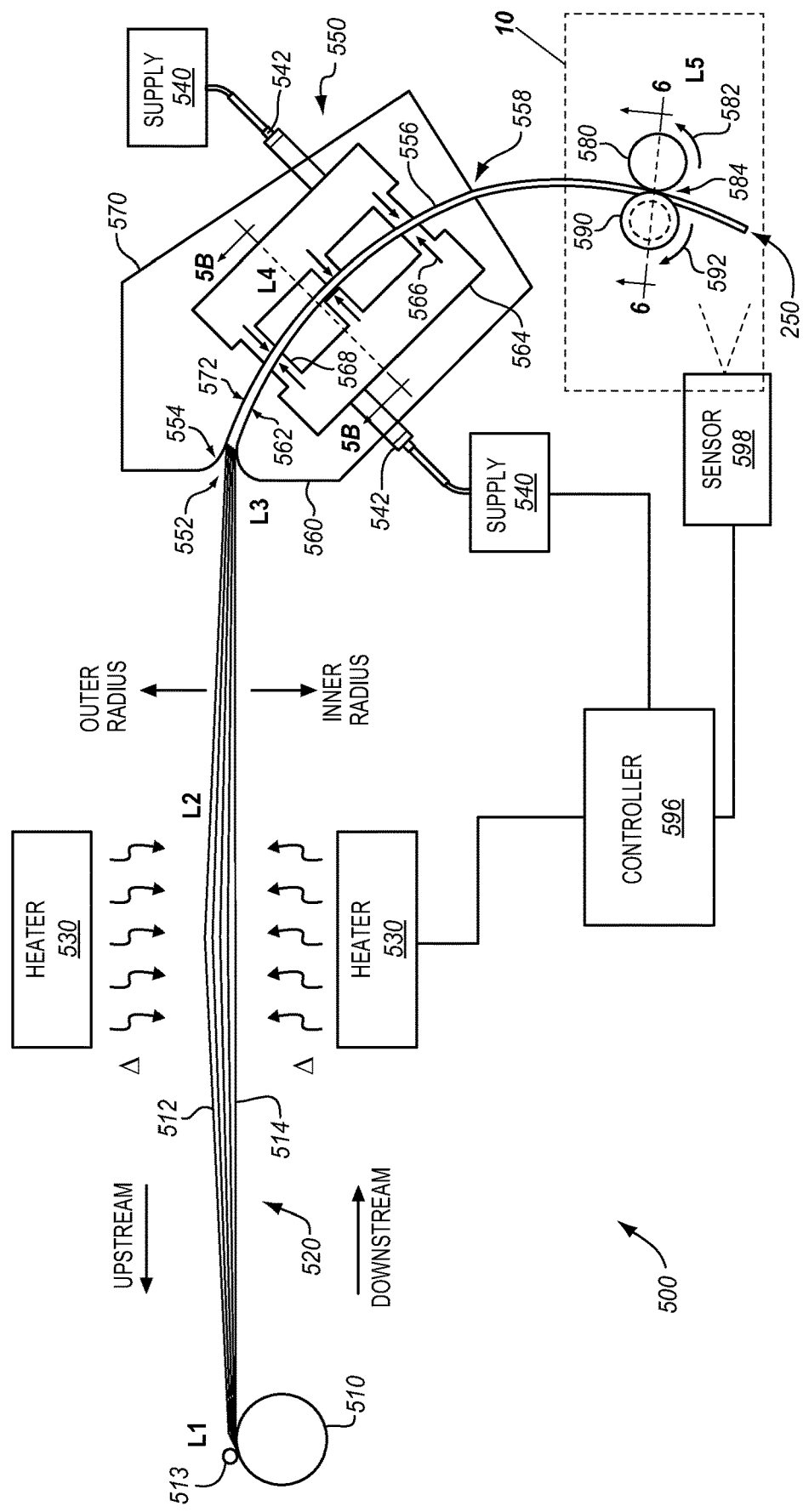
FIGS. 5A-5B are diagrams illustrating a pultrusion system for fabricating preforms for curved gap fillers in an exemplary embodiment.

With the properties of preform 250 readily described above, FIGS. 5-11 illustrate systems that automatically fabricate curved preforms. FIG. 5A is a diagram illustrating a pultrusion system 500 for fabricating preforms for curved gap fillers in an exemplary embodiment. Pultrusion system 500 is capable of pultruding a tape 520 of material in order to permanently enforce a desired curvature onto the tape 520. Tape 520 is heated above a sticking point temperature during pultrusion and then cooled after the curvature has been enforced in order to permanently change shape into a preform. That is, the transition temperature activates the binding properties of a constituent material (e.g., a tackifier) of tape 520. The preform may then be placed within a laminate without wrinkling or bunching within the laminate. Thus, the strength of a resulting composite part cured from the laminate will be enhanced.

Pultrusion system 500 operates to unwind a roll of tape 520 (comprising, e.g., a carbon fiber reinforced material) from spool 510 (at location L1), heat tape 520 above a sticking point temperature for a material (e.g., a thermoplastic binder or thermoset binder) within tape 520 (at location L2), and feed tape 520 through a die 550 (at location L3) having a channel that enforces a curvature onto tape 520. Pultrusion system 500 further cools tape 520 as tape 520 travels through die 550 (at location L4), and pulls tape 520 out of die 550 (at location L5). This results in a curved, pultruded preform 250 exiting pultrusion system 500.

In this embodiment, pultrusion system 500 includes spool 510, which stores wound tape 520 for shaping into a preform 250 for a curved gap filler. Spool 510 may also be referred to as a "noodle supplier," as it supplies material for forming into a "noodle." Tape 520 may comprise any suitable material capable of undergoing plastic deformation prior to curing into a composite part. In this embodiment, a length of tape 520 comprises carbon fibers (e.g., 512, 514) which extend lengthwise within tape, in addition to a thermoplastic binder (e.g., binder 340 of FIG. 3), a thermoplastic veil, etc.

Tape 520 is unwound from spool 510 proceeds past heaters 530, which apply heat (Δ) to tape 520 that causes the thermoplastic veil (or a thermoset resin) to reach or exceed a sticking point temperature and/or glass transition temperature (e.g., 80-160° Celsius (C) for thermoset resins, or 140-240° C. for thermoplastic veils). The heating ensures that tape 520 is capable of being reshaped by die 550 without fracturing or breaking. Heaters 530 may comprise any suitable heating components, such as radiant heaters that utilize an infrared radiant heating element. In further embodiments, multiple plies (e.g., multiple reels of tape from multiple spools 510) are unwound, tacked together, and heated in order to prepare the batch of plies for pultrusion into a single preform 250.

After tape 520 passes heaters 530, tape 520 is fed into entrance 552 of die 550, which includes a curve 554 that facilitates entry of tape 520 into die 550. Die 550 includes a curved channel 556 through which tape 520 is drawn. Channel 556 exhibits a curvature which is applied to tape 520 by the time that tape 520 exits die 550. In this embodiment, die 550 is formed from piece 560, which defines an inner radius 562, and piece 570, which defines an outer radius 572. Piece 560 forms a lower half of channel 556, and piece 570 forms an upper half of channel 556. Entrance 552 of die 550 may exhibit a circular inlet geometry in some embodiments. In such embodiments, channel 556 may transition along its length, sweeping from a large net cross-section to a smaller net cross-section, or channel 556 may be formed by sweeping a net cross section along a desired radius.

As tape 520 is fed through die 550, tape 520 is forced into a cross-sectional shape (557, shown in FIG. 5B) defined by die 550 (e.g., at hundreds of pounds of pressure). Tape 520 is further actively curved into a desired shape by channel 556. Because a curvature will be enforced upon tape 520, fibers 512 and 514 within tape 520 will slip with respect to each other within die 550. That is, fiber 512 at an outer radius 572 will utilize more fiber length than fiber 514 which is at an inner radius 562. This slippage occurs between fibers of tape 520. In embodiments wherein multiple plies of tape 520 are pultruded together to form a single preform 250, individual layers of tape may slip relative to each other when pultruded, causing fibers in outer plies to form a radius of greater length than the inner radius, similar to the outer lanes of a running track when compared to the inner lanes. The slippage may exist even when the average radius of curvature is large (e.g., fifty to one hundred inches) and the difference between inner and outer radius is small (e.g., one quarter of an inch). Thus, by feeding tape 520 through channel 556 of die 550, pultrusion system 500 enforces varying path lengths between fibers within tape 520. By enforcing slippage between fibers relative to each other while the fibers are being actively shaped by pultrusion through die 550, pultrusion system 500 prevents the formation of wrinkles in the resulting preform 250. Die 550 may be constructed, for example, from metal or from a resilient plastic.

Each piece of die 550 also includes a cooling chamber 564 through which pressurized fluid 566 (e.g., gaseous compressed air, liquid water, or a refrigerant) may travel. The pressurized fluid 566 is cooled below the desired temperature (e.g., to ambient temperature or below), and the pressurized fluid 566 is blown through passages 568 onto tape 520 as tape 520 travels within die 550. In some embodiments, liquids and chemical refrigerants are used to cool tape 520 by conduction through an evaporator or conventional refrigeration circuit. In such embodiments, die 550 may be dimensioned such that these liquids do not directly contact tape 520 during cooling.

Figure 5B:
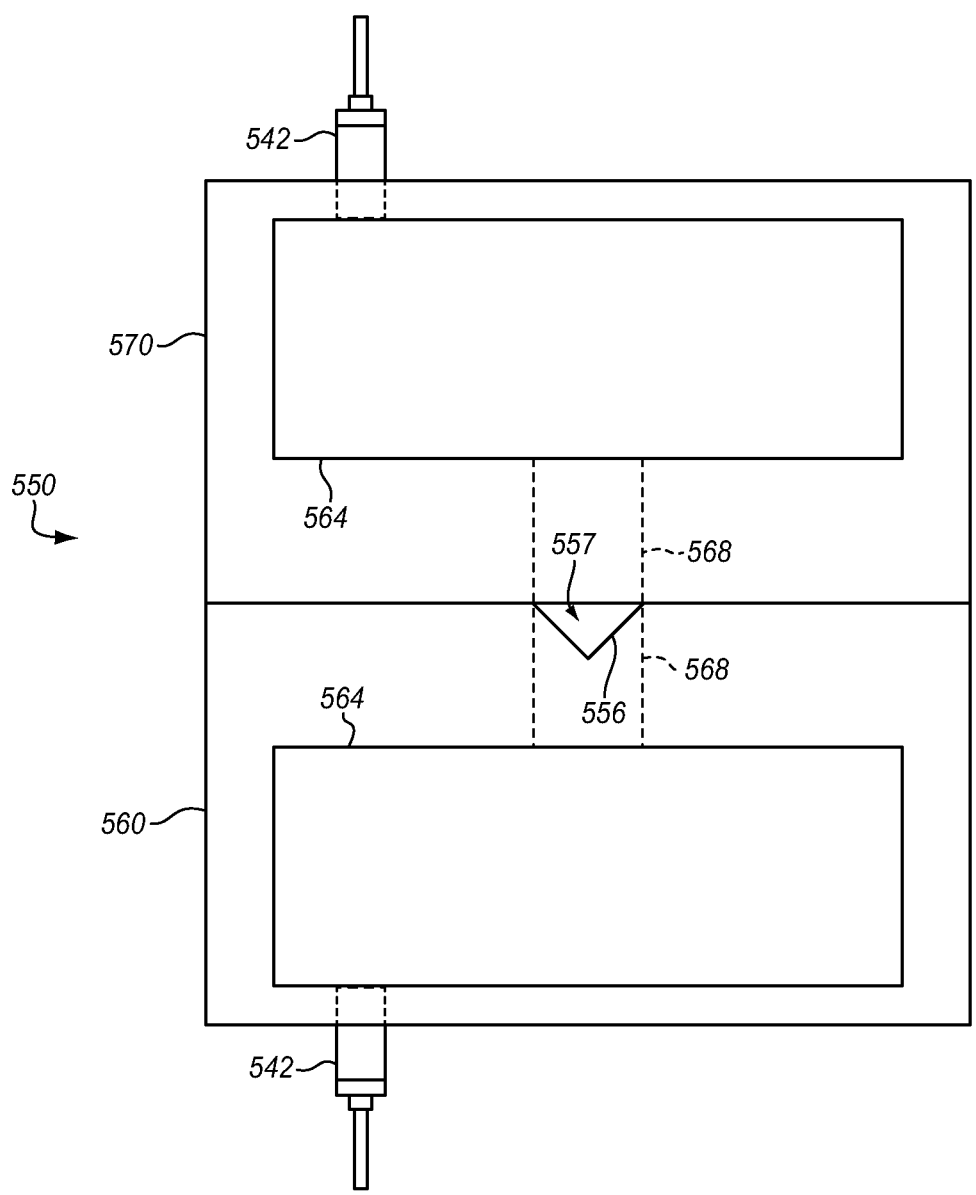

In this manner, tape 520 (and/or die 550) is rapidly cooled below the sticking point temperature via forced convective heat transfer with the pressurized fluid 566, while traveling through die 550. This causes tape 520 to solidify upon exiting die 550. In this embodiment, pressurized fluid 566 is supplied to chambers 564 from supplies 540 via ports 542. Furthermore, chambers 564 are downstream of entrance 552. FIG. 5B illustrates a cross-section of die 550 further illustrating ports 542, chambers 564, channel 556, and cross-sectional shape 557. FIG. 5B corresponds with view arrows 5B of FIG. 5A.

In a further embodiment, each piece of die 550 is removably mounted in place (e.g., via screws, clamps, etc.). In this manner, pieces of die 550 may be removed and replaced with pieces having different radii of curvature. Processing may then be resumed (e.g., for the same spool 510 of tape 520) to apply the new curvature to a different section of tape 520.

Tape 520 is pulled out of exit 558 of die 550 via rollers in region 10. In this embodiment, the rollers include roller 590 and roller 580. Roller 590 rotates in direction 592, and roller 580 rotates in direction 582. Roller 590 and roller 580 may jointly be referred to as a "noodle tensioning device." A nip 584 between roller 590 and roller 580 provides gripping and pulling action to tape 520. The rollers apply a pulling force (e.g., one hundred pounds of force) in order to pull tape 520 (which has now been formed into preform 250) out of die 550. This force also applies tension to tape 520, ensuring that tape 520 remains taught. In further embodiments, roller 580, roller 590, and/or spool 510 may include a clutch and/or brake to facilitate tension control.

Lengths of preform 250 may then be stored for later application to a laminate that will be cured into a composite part. Throughout the process, controller 596 may regulate unwinding, feeding, and pulling of tape 520 by preventing tension at tape 520 from exceeding a target value or going outside of a target range.

Controller 596 may manage the various operations of the components of pultrusion system 500 described above. For example, controller 596 may adjust an amount of pulling force applied by rollers 580 and 590, an amount of pressurized fluid applied via passages 568 which couple cooling chambers 564 to channel 556, or an amount of heat applied by heaters 530 in order to ensure that a steady-state process is reached wherein the unwinding, heating, feeding, cooling and pulling are performed simultaneously upon the tape at different locations along the tape. Controller 596 may be implemented, for example, as custom circuitry, as a hardware processor executing programmed instructions, or some combination thereof. A sensor 598 is also depicted in FIG. 5A, and may be utilized by controller 596 to determine/monitor a speed of pultrusion of tape 520. Controller 596 may therefore engage in active feedback control by regulating the pulling force of roller 580 and roller 590 based on input from sensor 598. Sensor 598 may comprise a camera, a laser, a rolling conveyor sensor, etc. Sensor 512 at spool 510 detects the amount of torsion to be applied to keep tape 520 at a desired level of tension. Sensor 513 may also be utilized by controller 596 to provide feedback control of the rollers 580 and 590 to maintain desired feed rate. Roller 510 provides tension in tape 520 to ensure intimate contact between fibers during the forming process. Rollers 590 and 580 are controlled to maintain feed rate of material through the system.

In a further embodiment, roller 580 and/or roller 590 include sensors that measure resistance of tape 520 being pulled. This measure is indicative of a level of tension at tape 520. Hence, controller 596 may utilize input from roller 580 and/or roller 590 to adjust an amount of force applied by these rollers to tape 520. This may be performed in order to ensure that tension at tape 520 is kept between a desired minimum and maximum level of tension.

Figure 6:
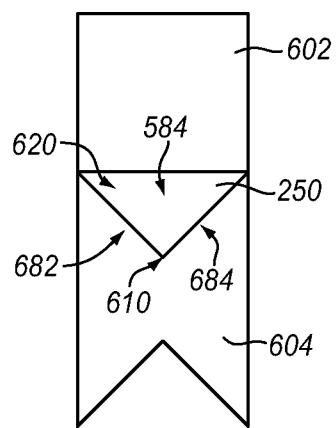
FIGS. 6-8 illustrate various arrangements of rollers for a pultrusion system in an exemplary embodiment.
Figure 7:
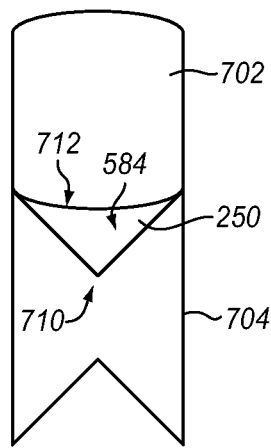
Figure 8:
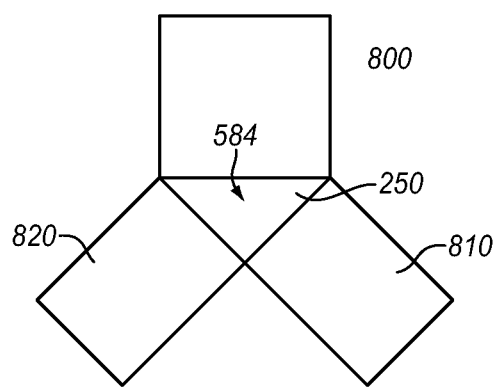
Figure 9:
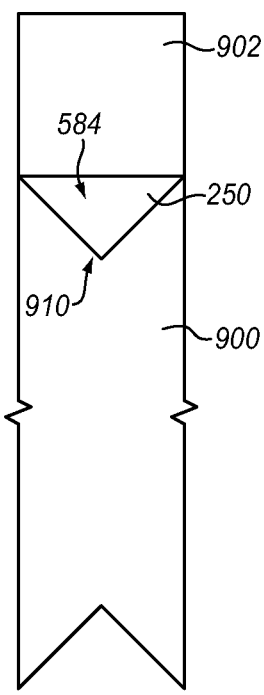
FIGS. 9-11 illustrate further arrangements of rollers for a pultrusion system in an exemplary embodiment.
Figure 10:
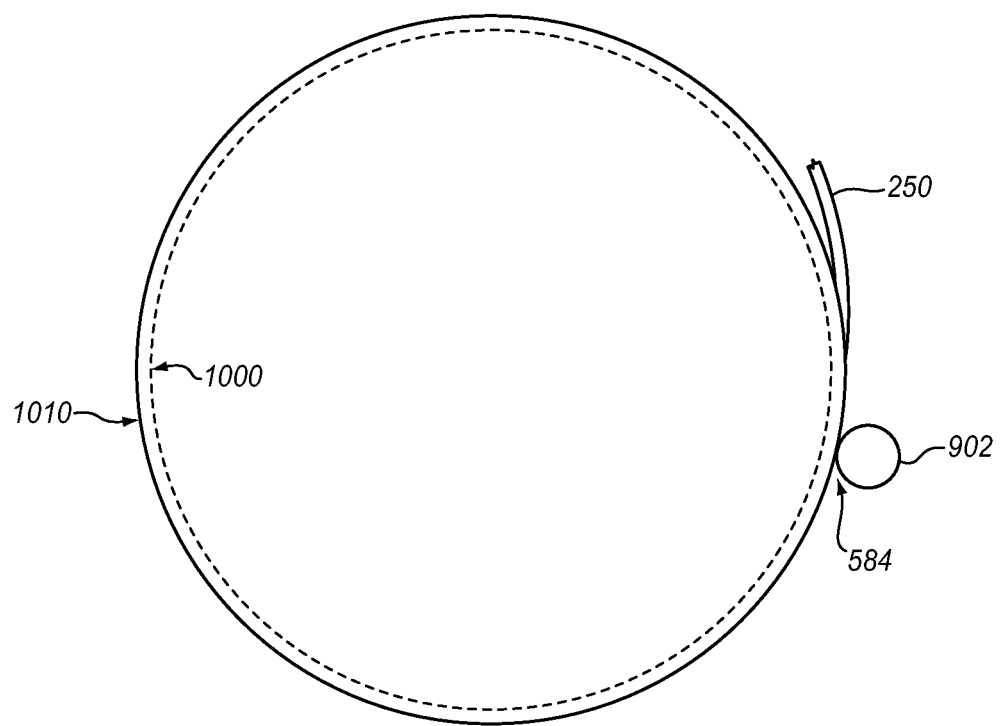

FIGS. 6-10 illustrate various arrangements of rollers for pultrusion system 500 that forms nip 584 in an exemplary embodiment. FIGS. 6-9 illustrate these rollers from a cross-sectional view indicated by view arrows 6 of FIG. 5A. FIG. 10 illustrates a roller from a side view of region 10 of FIG. 5. FIG. 6 illustrates a pair of rollers 602 and 604 which pull a preform 250 having a triangular cross-section 620. In this embodiment, roller 604 includes a groove 610 which corresponds with two of the sides (682, 684) of nip 584 for handling preform 250. Meanwhile, roller 602 corresponds with a third side of the nip for handling preform 250. Rollers 602 and 604 may be held against or in relation with each other at a desired level of force (e.g., fifty pounds of force) to ensure that they are in contact with preform 250, or may be mounted to ensure a desired level of friction (and therefore pulling force) is applied to preform 250 as rollers 602 and 604 rotate. FIG. 7 illustrates a similar embodiment to that of FIG. 6, wherein a roller 704 with a groove 710 works in tandem with another roller 702. However, in FIG. 7 roller 702 includes a curved surface 712 to conform the edge of the nip with a preform 250 having a curved cross-section (e.g., in circumstances where die 550 enforces a curved shape on one or more sides of tape 520, necessitating a nip with a curved edge). FIG. 8 illustrates a further embodiment wherein three separate rollers 800, 810, and 820 each are held in contact with a different side of preform 250. In further embodiments, any suitable number of rollers (e.g., three) may be utilized (e.g., to form a nip contacting any suitable number of sides of preform 250). In some embodiments, nip 584 is slightly smaller than the cross-section of preform 250, which facilitates gripping/friction when pulling preform 250 forward.

FIGS. 9-10 illustrate a further embodiment wherein rollers 902 and 900 exhibit different sizes (FIG. 10 corresponds with region 10 of FIG. 5A). In such embodiments, the rotation speed and/or torque applied by the rollers may be adjusted to ensure that tape 520 travels between the rollers without delay and without breaking. Roller rotation speeds at the nip and reel torque resistance may be analyzed to control pull speeds throughout the process without breaking preform 250. In this embodiment, roller 900 is a large drum having a groove 910 with an inner radius 1000 corresponding to inner radius 562 of die 550, and an outer radius 1010 corresponding with outer radius 572 of die 550. By utilizing this combination of rollers, preform 250 is not subjected to stresses or strains that could otherwise result from pulling preform 250 "straight out" of (i.e., in a direction perpendicular to) the exit of die 550. In this manner, kinking of preform 250 is prevented as preform 250 exits die 550. That is, the combination of rollers helps to prevent further curvature (or undesired curvature) from being applied to preform 250 after exiting die 550. The exit of die 550 may have a smaller cross-sectional area than an inlet of die 550. This may correspond to the decrease in cross-sectional area of tape 520 as tape 520 is pulled through die 550.

Figure 11:
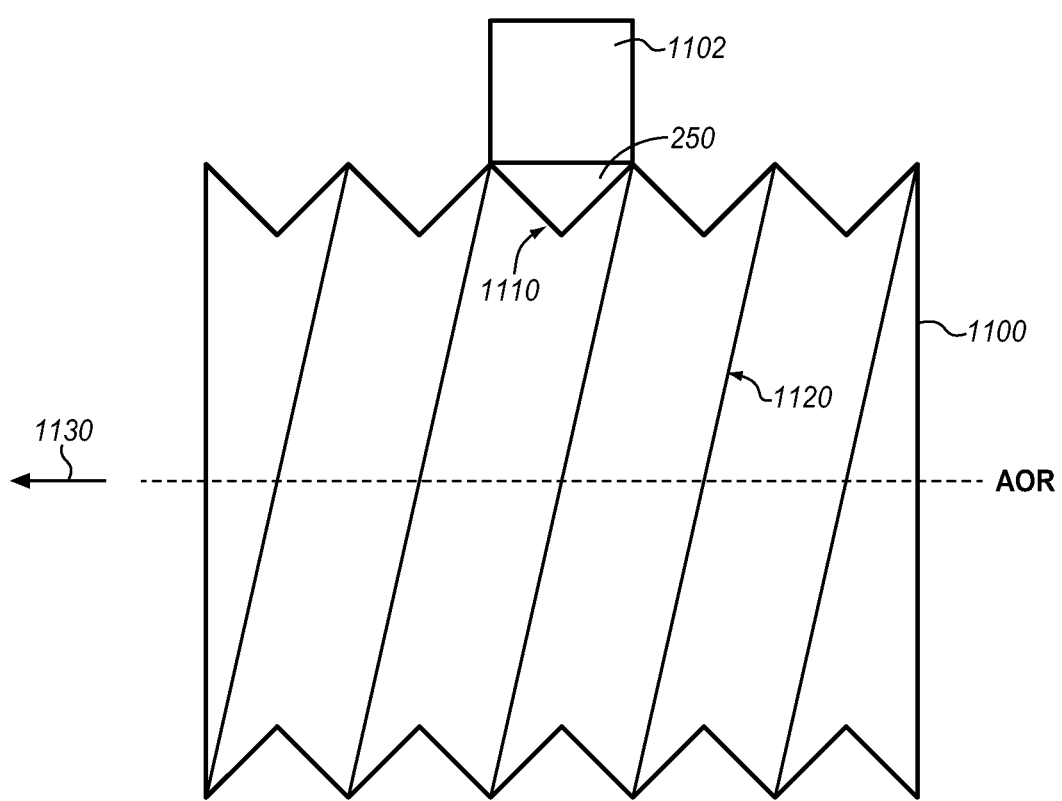

FIG. 11 illustrates a further embodiment which utilizes a roller 1100 having a helical groove 1110 in an exemplary embodiment. Roller 1100 interacts with roller 1102 to pull preform 250. Helical groove 1110 includes ridges 1120. In this embodiment, helical groove 1110 continues along a circumference of roller 1100 as roller 1100 rotates along an Axis of Rotation (AOR) in order to wrap preform 250 multiple times along roller 1100 for storage. Hence, groove 1110 is coiled about roller 1100 like a helical spring. Roller 1100 translates along the AOR during rotation as indicated by arrow 1130, causing preform 250 (formed from tape 520) to wrap into helical groove 1110. In this manner, preform 250 may be wrapped about the circumference of roller 1100 multiple times (e.g., like a coil). This increases the amount of preform 250 that may be stored at roller 1100.

Illustrative details of the operation of pultrusion system 500 will be discussed with regard to FIG. 12. Assume, for this embodiment, that an operator has loaded a spool 510 of tape 520, and has fed an angled (e.g., cut) tip of tape 520 through die 550 and into rollers 580 and 590. Thus, a leader section of preform 250 may exist which does not yet have a desired cross-section or curvature. This leader section may be pulled through pultrusion system 500 and then removed. Hence, the leader section is used to prime the process of preform creation, and will not be a part of the preform 250 as laid-up into a composite part. Pultrusion system 500 is capable of drawing additional tape 520 through die 550 by operation of rollers 580 and 590.

Figure 12:
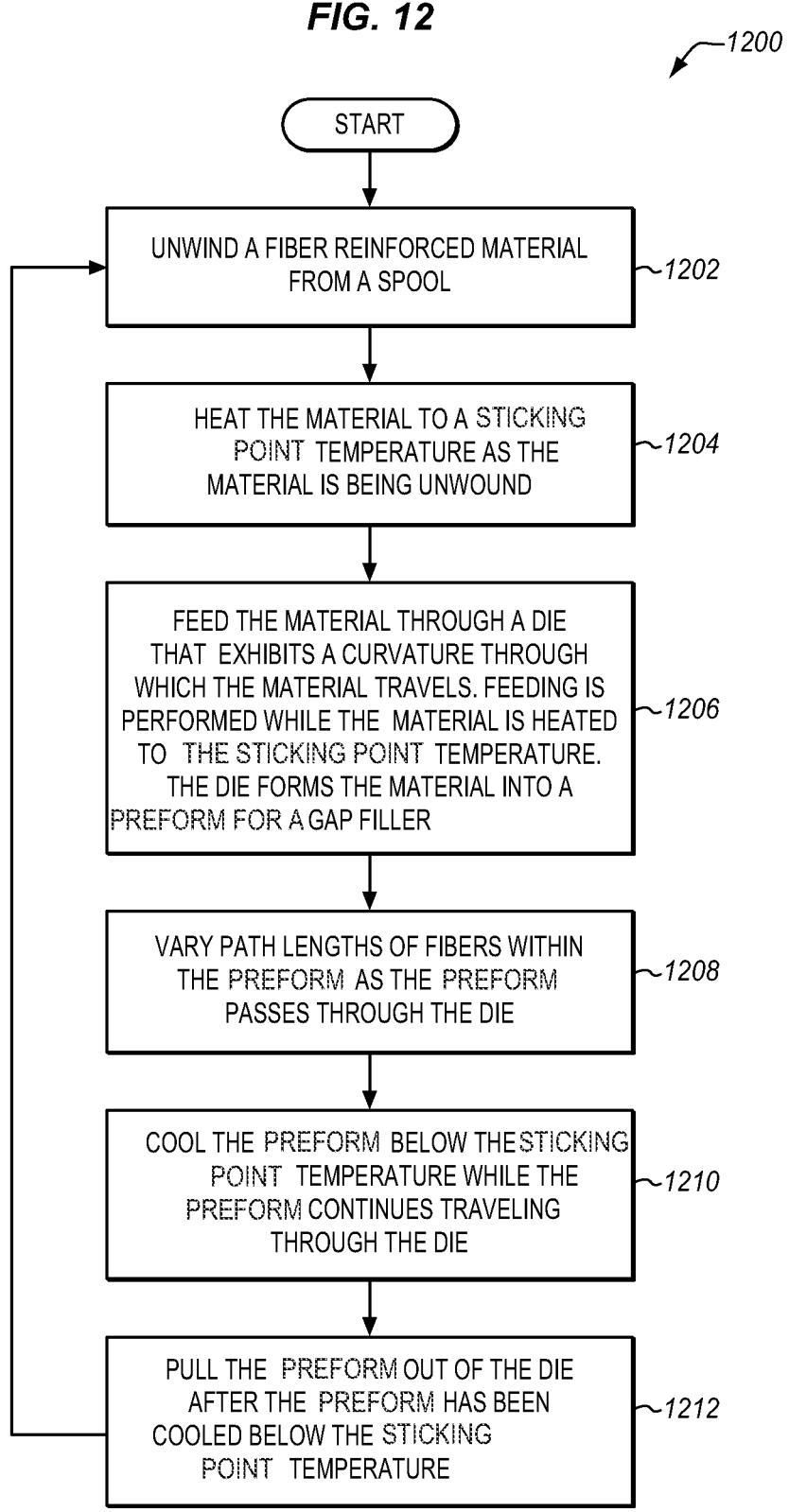
FIG. 12 is a flowchart illustrating a method for operating a pultrusion system in an exemplary embodiment.

FIG. 12 is a flowchart illustrating a method 1200 for operating a pultrusion system in an exemplary embodiment. The steps of method 1200 are described with reference to pultrusion system 500 of FIG. 1, but those skilled in the art will appreciate that method 1200 may be performed in other systems. The steps of the flowcharts described herein are not all inclusive and may include other steps not shown. The steps described herein may also be performed in an alternative order.

Controller 596 directs operation of driven rollers 580 and 590 to initiate rotation, which applies friction to preform 250, causing preform 250 (and therefore tape 520) to advance, being pulled from upstream to downstream. This results in unwinding of tape 520 from spool 510 (step 1202). During this process, controller 596 may actively use input from sensors (e.g., sensor 598) to regulate an amount of force applied by roller 580 and roller 590, in order to ensure that tension is maintained at a desired level via nip 584. Thus, nip 584 may be dimensioned to be smaller than the cross section of preform 250 in order to provide sufficient clamping force. The material geometry of preform 250 has already been set by the heating, forming and cooling process. Thus, when preform 250 is compressed at nip 584, the shape of preform 250 will fully recover once preform 250 exits nip 584.

After unwinding from spool 510, tape 520 is pulled across heaters 530, which apply heat (Δ of FIG. 5A) that raises tape 520 above a sticking point temperature for thermoplastic binder 340 (step 1204). The heating process occurs within one section of tape 520 at L2 as tape 520 continues to be unwound at L1.

Roller 580 and 590 continue operation, causing tape 520 to be fed through die 550 while tape 520 is heated to (i.e., at or above) the sticking point temperature (step 1206). Die 550 forms tape 520 into preform 250. Die 550 may exhibit a substantially different cross-sectional area than tape 520 does before entering die 550. For example, die 550 may exhibit one tenth of the width of tape 520 as stored at spool 510. This means that a great deal of compressive pressure is applied to tape 520 (e.g., one hundred pounds per square inch or more) as tape 520 enters die 550 and forms preform 250. Die 550 exhibits a curvature (e.g., radius 562 and radius 572) through which preform 250 travels. This curvature is enforced onto preform 250, and causes fibers 512 and 514, and/or plies to slip with respect to each other while tape 520 remains malleable. In this manner, the path lengths of fibers within preform 250 are varied as preform 250 passes through die 550 (step 1208). As preform 250 continues traveling through die 550, preform 250 is cooled below the sticking point temperature (step 1210) by application of pressurized fluid 566 to passages 568 (or other means discussed above). This solidifies thermoplastic binder 340 within preform 250, which hardens preform 250.

Rollers 580 and 590 continue to operate to pull preform 250 out of die 550 after preform 250 has been cooled below the sticking point temperature (step 1212). Preform 250 pulled from die 550 may then be stored on a drum for later application to a laminate that will be cured into a composite part.

Method 1200 provides a substantial benefit over prior techniques for forming preforms, because method 1200 allows for preforms 250 which are curved along their length to be formed via pultrusion processes. This technique prevents wrinkle formation when a preform 250 is applied to a laminate awaiting curing. Furthermore, this technique allows for rapid and economical automated fabrication of preforms.

EXAMPLES

In the following examples, additional processes, systems, and methods are described in the context of a pultrusion system that utilizes a curved die.

Figure 13:
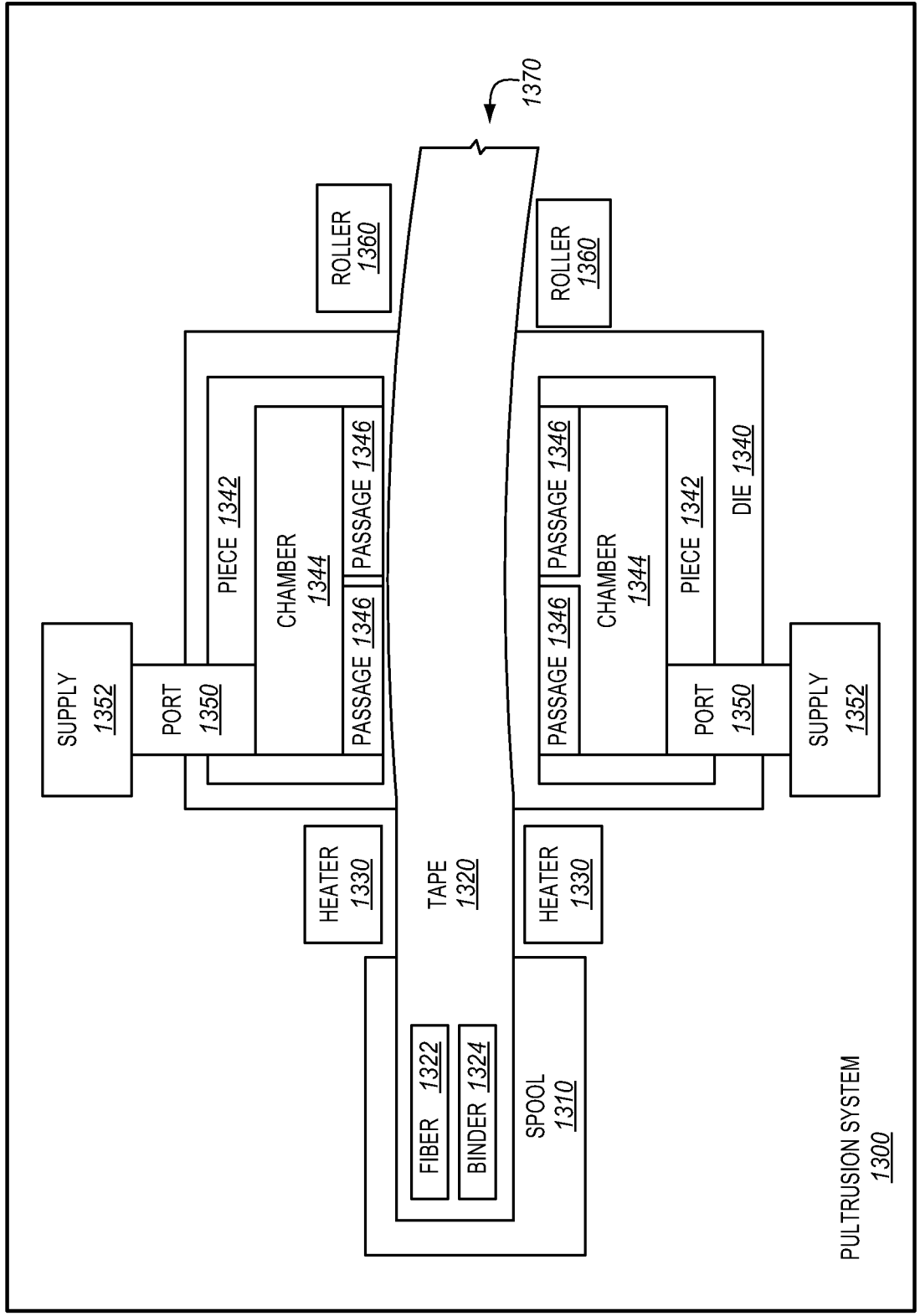
FIG. 13 is a block diagram of a pultrusion system in an exemplary embodiment.

FIG. 13 is a block diagram of a pultrusion system 1300 in an exemplary embodiment. Pultrusion system 1300 heats, shapes, and cools tape 1320 in order to conform with a desired curvature. In this embodiment, pultrusion system 1300 includes spool 1310, about which tape 1320 is wound. Tape 1320 includes a thermoplastic or thermoset binder 1324, as well as carbon fibers 1322 which reinforce the strength of tape 1320. In this example, heaters 1330 apply radiant heat that increases the temperature of tape 1320 until tape 1320 is pliable. Tape 1320 proceeds into die 1340, which includes pieces 1342. Each piece 1342 defines either an inner or an outer radius of curvature. In this embodiment, each piece 1342 further comprises a chamber 1344 and multiple passages 1346. Pressurized air from supply 1352 enters a chamber 1344 via port 1350 in order to cool tape 1320, causing tape 1320 to solidify while exhibiting the desired curvature. Rollers 1360 pull tape 1320, which has been cooled until it has hardened into preform 1370, out of die 1340 for use in laying up a composite part.

Figure 14:
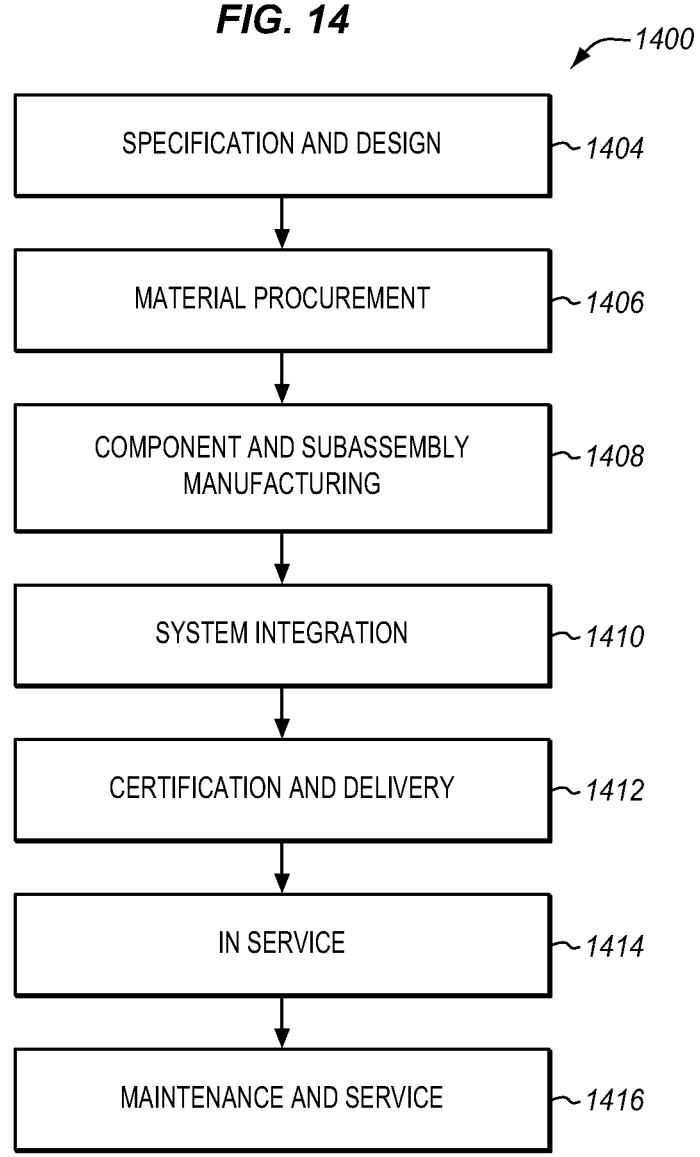
FIG. 14 is a flow diagram of aircraft production and service methodology in an exemplary embodiment.
Figure 15:
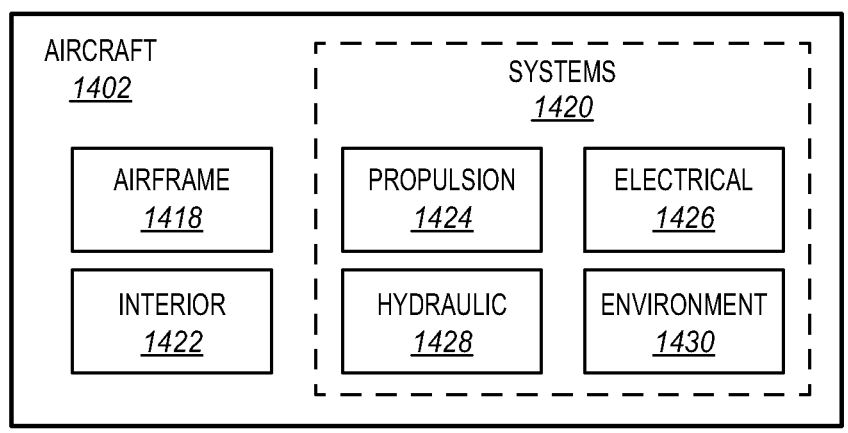
FIG. 15 is a block diagram of an aircraft in an exemplary embodiment.

Referring more particularly to the drawings, embodiments of the disclosure may be described in the context of an aircraft manufacturing and service method 1400 as shown in FIG. 14 and an aircraft 1402 as shown in FIG. 15. During pre-production, exemplary method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 in order to be placed in service 1414. While in service by a customer, the aircraft 1402 is scheduled for routine maintenance and service 1416 (which may also include modification, reconfiguration, refurbishment, and so on). Apparatus and methods embodied herein may be employed during any one or more suitable stages of the production and service method 1400 (e.g., specification and design 1404, material procurement 1406, component and subassembly manufacturing 1408, system integration 1410, certification and delivery 1412, service 1414, maintenance and service 1416) and/or any suitable component of aircraft 1402 (e.g., airframe 1418, systems 1420, interior 1422, propulsion 1424, electrical 1426, hydraulic 1428, environmental 1430).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 1402 produced by exemplary method 1400 may include an airframe 1418 with a plurality of systems 1420 and an interior 1422. Examples of high-level systems 1420 include one or more of a propulsion system 1424, an electrical system 1426, a hydraulic system 1428, and an environmental system 1430. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1400. For example, components or subassemblies corresponding to production stage 1408 may be fabricated or manufactured in a manner similar to components or subassemblies produced while the aircraft 1402 is in service. Also, one or more apparatus embodiments, method embodiments, or a combination thereof may be utilized during the production stages 1408 and 1410, for example, by substantially expediting assembly of or reducing the cost of an aircraft 1402. Similarly, one or more of apparatus embodiments, method embodiments, or a combination thereof may be utilized while the aircraft 1402 is in service, for example and without limitation, to maintenance and service 1416. For example, the techniques and systems described herein may be used for steps 1406, 1408, 1410, 1414, and/or 1416, and/or may be used for airframe 1418 and/or interior 1422. These techniques and systems may even be utilized for systems 1420, including for example propulsion 1424, electrical 1426, hydraulic 1428, and/or environmental 1430.

In one embodiment, preform 250 comprises a portion of a stringer at airframe 1418, and is manufactured during component and subassembly manufacturing 1408. The stringer may then be assembled into an aircraft in system integration 1410, and then be utilized in service 1414 until wear renders the stringer unusable. Then, in maintenance and service 1416, the stringer may be discarded and replaced with a newly manufactured stringer, or may be repaired. New preforms 250 may be utilized throughout component and subassembly manufacturing 1408 in order to facilitate fabrication of the new stringer.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof

What is claimed is:

1. A system comprising:
a heater that heats fiber reinforced material to a sticking point temperature of a constituent material of the fiber reinforced material;
a pultrusion die, downstream of the heater, having a channel that enforces a curvature along a length of the fiber reinforced material to form the fiber reinforced material into a preform for a gap filler;
a cooling chamber that places the fiber reinforced material into direct contact with a fluid; and
rollers that form a nip to pull the preform out of the pultrusion die, the nip having a cross-sectional shape of the channel.

2. The system of claim 1 wherein:
the nip is dimensioned smaller than a cross-section of the preform exiting the pultrusion die to compress the preform at the nip.

3. A system comprising:
at least one spool for holding a roll of fiber reinforced material comprising a constituent material;
a heater downstream of the spool that heats the fiber reinforced material to a sticking point temperature of the constituent material;
a pultrusion die, downstream of the heater, having a channel with a lengthwise curvature that is enforced upon a length of the fiber reinforced material, and forms the fiber reinforced material into a preform for a gap filler;
a cooling chamber that places the fiber reinforced material into direct contact with a fluid; and
rollers downstream of the pultrusion die that form a nip in a cross-sectional shape of the channel.

4. The system of claim 3 wherein:
the constituent material comprises a thermoplastic binder; and
the heater comprises a radiant heater that heats the fiber reinforced material to between 150 and 200 degrees Celsius.

5. The system of claim 3 wherein:
an entrance to the pultrusion die is curved.

6. The system of claim 5 wherein:
the entrance to the pultrusion die is circular.

7. The system of claim 3 wherein:
the pultrusion die comprises removable pieces which may be interchanged to adjust a radius of the curvature.

8. The system of claim 3 wherein:
an exit of the pultrusion die has a smaller net cross-sectional area than an inlet of the pultrusion die.

9. The system of claim 3 wherein:
one of the rollers comprises a helical groove that extends along a circumference of the roller.

10. The system of claim 9 wherein:
the roller translates axially along its axis of rotation during rotation, causing the preform to wrap into the helical groove.

11. The system of claim 3 wherein:
the rollers comprise a roller having an outer radius equal to the curvature of the pultrusion die, and the roller applies tension to the preform exiting the pultrusion die by rotating.

12. The system of claim 3 wherein:
at least one of the rollers comprises a groove corresponding with a shape of at least one side of the preform after exiting the pultrusion die.

13. The system of claim 3 wherein:
the rollers comprise, for each side of the preform as the preform exits the pultrusion die:
a roller directly contacting the side of the preform and matching a shape of the side of the preform.

14. The system of claim 3 wherein:
the cooling chamber is within the pultrusion die.

15. The system of claim 3 wherein:
the nip is dimensioned smaller than a cross-section of the preform exiting the pultrusion die to compress the preform at the nip.

16. A system comprising:
at least one spool for holding a roll of fiber reinforced material comprising a constituent material;
a heater downstream of the spool that heats the fiber reinforced material to a sticking point temperature of the constituent material;
a pultrusion die, downstream of the heater, having a channel with a lengthwise curvature that is enforced upon a length of the fiber reinforced material, and forms the fiber reinforced material into a preform;
a cooling chamber through which pressurized fluid is configured to travel, that cools the preform;
rollers downstream of the pultrusion die that form a nip in a cross-sectional shape of the channel; and
a controller configured to manage adjustment at least one of:
an amount of pulling force applied by the rollers on the preform, an amount of the pressurized fluid applied to cool the preform, and an amount of heat applied by the heater.

17. The system of claim 16 wherein:
the constituent material comprises a thermoplastic binder; and
the heater comprises a radiant heater that heats the fiber reinforced material to between 150 and 200 degrees Celsius.

18. The system of claim 16 wherein:
the pultrusion die comprises removable pieces which may be interchanged to adjust a radius of the curvature.

19. The system of claim 16 wherein:
one of the rollers comprises a helical groove that extends along a circumference of the roller.

20. The system of claim 16, wherein:
an exit of the pultrusion die has a smaller net cross-sectional area than an inlet of the pultrusion die.

* * * * *